Patented Dec. 27, 1932

1,892,055

UNITED STATES PATENT OFFICE

KARL HOLZACH, OF LUDWIGSHAFEN-ON-THE-RHINE, HANS KRZIKALLA, OF MANNHEIM, AND WERNER MUELLER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

AZO DYESTUFFS

No Drawing. Application filed March 8, 1929, Serial No. 345,590, and in Germany March 10, 1928.

The present invention relates to new o-hydroxy azo dyestuffs.

We have found that valuable o-hydroxy azo dyestuffs can be obtained by diazotizing a sulfonated aromatic o-hydroxy amino compound, which term is meant to comprise o-amino phenols, o-aminonaphthols, and their derivatives, and combining them with an unsulfonated monohydric phenol derivative containing at least two further substituents one of which is in the para-position to the hydroxyl group. Phenol derivatives according to the present invention comprise for example, p-chlor-m-cresol ($CH_3 : OH : Cl = 1 : 3 : 6$), 2.4-dimethyl-phenol (asymmetric m-xylenol), 2.4.5-trimethyl phenol (pseudocumenol), also 3-amino-4-methylphenol, and others.

The dyestuffs obtainable according to this invention are distinguished by a great coloring power and good equalizing properties in dyeing. The dyeings on wool are extremely fast after an after-treatment with metallic salts, such as salts of chromium or copper. Depending on the o-hydroxydiazo compound and phenol derivative employed, red, violet, brown, olive green or black shades are obtained.

The following examples will further illustrate the nature of this invention but the invention is not restricted to these examples. The parts are by weight.

Example 1

70.2 parts of 4-nitro-2-aminophenol-6-sulfonic acid are diazotized with 40 parts of 19° Baumé hydrochloric acid and 20.7 parts of sodium nitrite, in the usual way. The diazo solution is allowed to run slowly into an ice-cold solution of 41 parts of asymmetric m-xylenol (2.4-dimethyl phenol), 35 parts of 40° Baumé caustic soda solution, about 600 parts of water, and 150 parts of sodium carbonate. The mixture is stirred at about 5° to 10° centigrade until the formation of the dyestuff is complete, whereupon sufficient common salt is added to effect the complete deposition of the dyestuff. When filtered and dried, the new dyestuff is in the form of a black-brown powder, which readily dissolves to a yellow brown solution in water, the color changing to cherry red on the addition of caustic soda, or to reddish yellow with acetic acid. The dyestuff gives pale yellow-brown dyeings on wool, turning to a deeper brown shade with yellowish sheen on chroming.

If the 4-nitro-2-aminophenol-6-sulfonic acid in the above example is replaced by a corresponding amount of 6-nitro-2-amino phenol-4-sulfonic acid, a similar dyestuff is obtained, which gives red-brown dyeings on wool, changing to black-brown on treatment with bichromate.

Example 2

44.7 parts of 4-chloro-2-amino phenol-6-sulfonic acid are diazotized with 30 parts of 19° Baumé hydrochloric acid and 13.8 parts of sodium nitrite in the usual way. A solution is prepared by warming 30 parts of pseudocumenol (2.4.5-trimethylphenol) with 25 parts of 40° Baumé caustic soda solution in about 400 parts of water, 100 parts of sodium carbonate being added, and the whole is cooled with ice to 7° to 8° centigrade. The above diazo solution is allowed to run moderately into the solution of the coupling component. The formation of the dyestuff proceeds gradually, the mixture is stirred at a low temperature until the formation of the dyestuff is finished; the dyestuff is salted out, filtered and dried.

The new dyestuff is a red-brown powder which is very readily soluble, to a dark brown solution, in water. It gives from an acid bath brown-red dyeings on wool, the color being changed to dark brown by chroming, which latter improves the fastness properties very considerably.

If pseudocumenol is combined with diazotized 4-nitro-2-amino phenol-6-sulfonic acid in a similar manner, a new dyestuff is obtained which gives red-brown dyeings on wool from an acid bath, extremely even olive-brown shades being produced by chroming.

Example 3

70 parts of 4-chlor-2-amino phenol-6-sulfonic acid, in aqueous solution, are diazotized in the presence of about 75 parts of 19° Beaumé hydrochloric acid and ice, with the necessary amount of sodium nitrite, at about 0–5° centigrade in the usual way. The diazo solution is stirred into a solution containing 39 parts of o-amino-p-cresol and the equivalent quantity of caustic soda solution, together with a sufficient amount of sodium carbonate to keep the reaction alkaline throughout the coupling process, which is fairly rapid. After stirring for several hours, the mixture is warmed and the dyestuff is salted out with common salt. It is distinguished by a great tinctorial power, and gives bright brown dyeings on wool, turning to a fast, deep violet-black on chroming.

The dyestuff obtainable from the nitrated diazo compound of 1-amino-2-naphthol-4-sulfonic acid and o-amino-p-cresol in a similar manner, yields a handsome, strong, fast black shade when chromed.

The o-amino-p-cresol used as coupling component may be replaced by a derivative thereof substituted in the amino group, for example, the mono- or dialkyl-derivatives, by means of which variations in the depth of tint can be obtained.

*Example 4*

70.2 parts of 4-nitro-2-aminophenol-6-sulfonic acid are diazotized as described in Example 1, the solution is then allowed to run into a solution of 47 parts of 4-chlor-3-methylphenol and the equivalent amount of caustic soda and about 60 parts of sodium carbonate. When the coupling is completed, the mixture is warmed, and the dyestuff is salted out in the usual manner. The dyestuff dissolves in water to give a brown solution and dyes wool from an acid bath brownish-yellow shades. The dyeings on wool give fast yellow-brown shades on chroming. In this case also, the tone, equalizing properties and the like, can be modified by varying the substituents, both in the diazo compound and in the coupling component.

What we claim is:

1. As new articles of manufacture the o-hydroxyazo dyestuffs obtainable by coupling a diazotized sulfonated o-hydroxyamino compound of the benzene or naphthalene series with an unsulfonated monohydric phenol containing only substituents selected from the group consisting of halogen and alkyl groups at least two of which must be present and one must be in the para position to the hydroxy group.

2. As new articles of manufacture, the o-hydroxyazo dyestuffs obtainable by coupling diazotized 4-nitro-2-aminophenol-6-sulfonic acid with an unsulfonated monohydric phenol containing only substituents selected from the group consisting of halogen and alkyl groups at least two of which must be present and one must be in the para position to the hydroxy group.

3. As a new article of manufacture, the o-hydroxyazo dyestuff corresponding to the formula:

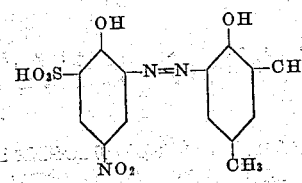

forming a black-brown powder, dissolving to a yellow brown solution in water, the color of which changes to cherry red on the addition of caustic soda and to reddish yellow on the addition of acetic acid, and giving yellow brown dyeings on wool turning to a deeper brown with yellowish sheen on chroming.

4. The o-hydroxyazo dyestuff corresponding to the formula:

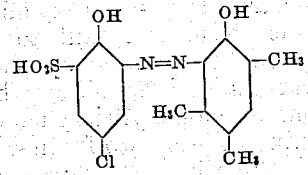

forming a red-brown powder readily soluble in water to give a dark brown solution and dyeing wool brown-red shades from an acid bath, the color being changed to dark brown by chroming.

5. The o-hydroxyazo dyestuff corresponding to the formula:

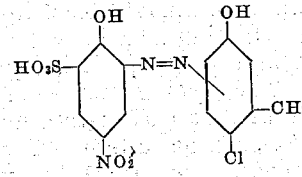

in which the 4-chlor-3-methylphenol radical is attached probably in its 6-position to the azo bridge, which dyestuff dissolves in water to give a brown solution and dyes wool from an acid bath brownish yellow shades which become yellowish brown on chroming.

In testimony whereof we have hereunto set our hands.

KARL HOLZACH.
HANS KRZIKALLA.
WERNER MUELLER.